United States Patent
Nakagawa et al.

(10) Patent No.: US 7,065,008 B2
(45) Date of Patent: Jun. 20, 2006

(54) OBJECTIVE LENS UNIT

(75) Inventors: Ryotaro Nakagawa, Osaka (JP); Toyoshi Nogami, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 472 days.

(21) Appl. No.: 10/413,547

(22) Filed: Apr. 15, 2003

(65) Prior Publication Data

US 2003/0202435 A1   Oct. 30, 2003

(30) Foreign Application Priority Data

Apr. 17, 2002 (JP) ............................ P2002-114321
Jul. 30, 2002 (JP) ............................ P2002-221179

(51) Int. Cl.
*G11B 7/09* (2006.01)
(52) U.S. Cl. .................................................. 369/44.21
(58) Field of Classification Search ...................... None
See application file for complete search history.

(56) References Cited

U.S. PATENT DOCUMENTS

| | | | |
|---|---|---|---|
| 5,319,497 A * | 6/1994 | Wakabayashi et al. ... | 369/44.21 |
| 5,453,881 A * | 9/1995 | Suzuki ..................... | 369/44.21 |
| 5,933,405 A * | 8/1999 | Song .......................... | 720/683 |
| 6,549,507 B1 * | 4/2003 | Peng ......................... | 720/681 |
| 6,625,091 B1 * | 9/2003 | Obara ...................... | 369/44.14 |
| 6,667,945 B1 * | 12/2003 | Omori ....................... | 720/681 |
| 6,762,891 B1 * | 7/2004 | Nakagawa .................. | 359/824 |
| 6,778,472 B1 * | 8/2004 | Nishikawa ............... | 369/44.21 |
| 6,885,627 B1 * | 4/2005 | Taugher ................... | 369/275.2 |
| 2002/0093889 A1 * | 7/2002 | Higashihara et al. .... | 369/44.21 |
| 2002/0191523 A1 * | 12/2002 | Warmenhoven ............. | 369/72 |
| 2002/0196720 A1 * | 12/2002 | Takeshita ................ | 369/53.19 |

FOREIGN PATENT DOCUMENTS

JP     11-161984       6/1999
JP     11259885 A  *  9/1999

* cited by examiner

Primary Examiner—William Klimowicz
Assistant Examiner—Nathan Danielsen
(74) Attorney, Agent, or Firm—Morgan, Lewis & Bockius LLP

(57) ABSTRACT

An objective lens has an actuator base and a lens holder for supporting an objective lens. The lens holder has a shaft hole. A shaft is disposed on the actuator base and fitted to the shaft hole. A cover is attached to the actuator base so as to cover the lens holder in a manner that the cover comes into contact with or comes close to the top face of the shaft. Protrusions are disposed on an actuator base opposing face and a cover opposing face of the lens holder without contacting the shaft. When the protrusions are contacted with the actuator base and the cover, a predetermined gap is formed between the lens holder and the actuator base and between the lens holder and the cover, the gap is communicated with a space in the cover through the side of the protrusions.

10 Claims, 12 Drawing Sheets

OBJECTIVE LENS UNIT

The present disclosure relates to the subject matter contained in Japanese Patent Application No. 2002-114321 filed Apr. 17, 2002, and Japanese Patent Application No. 2002-221179 filed Jul. 30, 2002, which are incorporated herein by reference in their entirety.

BACKGROUND OF THE INVENTION

1. Field of the Invention

The present invention relates to an objective lens unit capable of making a lens holder of an optical pickup of a disk player smoothly conduct a focusing motion.

2. Description of the Related Art

An example of the conventional objective lens unit is shown in FIGS. 18 to 22. This objective lens unit is composed as follows. At the center of a lens holder 1 to support an objective lens OL, there is provided a base section 1a that is protruded integrally with the lens holder. A shaft hole 2 of the base section 1a is engaged with a shaft 4 arranged on an actuator base 3. In the periphery of the base section 1a, there is provided a focusing coil 5. Further, on both sides of the lens holder 1, there are provided tracking coils 6. Rising plates 3a are raised from both side sections of the actuator base, and the lens holder 1 is interposed between the rising plates 3a. A pair of magnets 7 are arranged on the rising plates 3a. Both end portions of yokes 8, which are screwed to the actuator base 3, are inserted into through-holes 1b of the lens holder 1. A cover 9 is set on the lens holder 1. When a plurality of hooks 9a protruding from the inner face of the cover 9 are detachably engaged with the actuator base 3, a ceiling section of the cover 9 is contacted with or made to come close to a top face of the shaft 4. In this connection, reference numeral 10 is a printed board, which is connected to the focusing coil 5 and the tracking coil 6 via lead wires 10a.

In the above constitution, when the focusing coil 5 is energized with electric current so that the focusing coil 5 can be excited, the lens holder 1 is slid in the focusing directions "a" and "b" along the shaft 4, so that the objective lens OL can be focused on a disk (not shown). When the tracking coil 6 is energized with electric current, the lens holder 1 is oscillated in the tracking directions "c" and "d" around the shaft 4, so that objective lens OL can follow a predetermined track.

In an initial operation test conducted in a factory before the product is shipped, when a predetermined intensity of voltage is impressed upon the focusing coil 5 in a clean room, as shown in FIG. 21, the lens holder 1 is operated in the focusing directions "a" and "b" along the shaft 4 within an allowable range L. At that time, the stroke of the lens holder 1 is checked with a range finder (not shown) such as a laser beam displacement gauge. In the case where the stroke is not proportional to voltage, the product is determined to be defective.

In the above-described constitution, the following problems may be encountered. In the case of a focusing motion of the lens holder 1 conducted at the maximum stroke, an actuator base opposing face 1A formed on an end face of the base section 1a of the lens holder 1 collides with the actuator base 3, and a cover opposing face 1B of the lens holder collides with the cover 9 as shown by the virtual lines in FIG. 21. Therefore, even in a clean room, a very small quantity of dust D attaching to the actuator base 3 and the cover 9 gets into gap α formed between the shaft 4 and the shaft hole 2. Due to dust D which has gotten into gap α in this way, the focusing motion of the lens holder 1 can not be stabilized, and the objective lens unit might be judged to be a defective product.

According to JP-A-11-161984, it is possible to consider the structure shown in FIG. 22 in which bearing contact sections 11, the section of which is semicircular, are protruded at the upper and lower portions on the inner face of a shaft hole 2 so that annular recess sections 12 can be formed at the upper and lower end portions of the shaft hole 2. When a lens holder 1 conducts a focusing motion and comes into contact with an actuator base 3 or a cover 9, each annular recess portion 12 is tightly closed, so that dust D, which has gotten into each annular recess portion 12, can not go anywhere. Accordingly, there is a possibility that dust D in each annular recess portion is pushed into the shaft hole 2. Due to the foregoing, the focusing motion of the lens holder 1 becomes unstable, which might be judged to be a defective product.

SUMMARY OF THE INVENTION

In view of the above problems, it is an object of the present invention to provide an objective lens unit in which a focusing motion of a lens holder can be smoothly conducted.

In order to accomplish the above object, according to a first aspect of the invention, there is provided an objective lens unit comprising: an actuator base; a lens holder for supporting an objective lens, the lens holder having a shaft hole penetrating therethrough, an actuator base opposing face and a cover opposing face; a shaft disposed on the actuator base and fitted to the shaft hole, the shaft having a top face; a cover attached to the actuator base so as to cover the lens holder in such a manner that the cover comes into contact with or comes close to the top face of the shaft; protrusions disposed on the actuator base opposing face and the cover opposing face of the lens holder in such a manner that the protrusions do not contact the shaft; an annular blade section formed on the actuator base opposing face and the cover opposing face of the lens holder in such a manner that the annular blade section surrounds the shaft hole, the annular blade section having substantially triangular section and a protruding length smaller than that of the protrusions; a focusing coil disposed on the lens holder; and a tracking coil disposed on the lens holder, wherein the lens holder is capable of sliding in a focusing direction along the shaft by an excitation of the focusing coil and also capable of oscillating around the shaft in a tracking direction by an excitation of the tracking coil, and when the protrusions contact the actuator base and the cover, a predetermined gap is formed between the lens holder and the actuator base and between the lens holder and the cover, the gap is communicated with a space in the cover through the side of the protrusions.

According to the above constitution, when the lens holder conducts a focusing motion at the maximum stroke in the initial motion test which is made in a factory before the product is shipped, the protrusions arranged on the actuator base opposing face and the cover opposing face of the lens holder respectively collide with the actuator base and the cover. Due to the foregoing, a predetermined gap can be formed between the lens holder and the actuator base and also between the lens holder and the cover. Since the shaft hole of the lens holder is separate from the actuator base and the cover, there is no possibility that dust attaching to the actuator base and the cover gets into the shaft hole. Even when a relatively large quantity of dust exists in the above gap, the dust is naturally discharged into a space in the cover through the side of the protrusions. Therefore, the lens holder can smoothly conduct a focusing motion.

According to the focusing motion of the lens holder, dust attaching to the shaft can be scraped off by the annular blade sections protruding from the actuator base opposing face and the cover opposing face of the lens holder so that the dust can not get into the shaft hole. Further, since the protruding height of the annular blade section is smaller than the height of the protrusions, even when the lens holder conducts a focusing motion at the maximum stroke, there is no possibility that the dust attaching to the actuator base and the cover gets into the gap formed between the annular blade section and the shaft.

According to a second aspect of the invention, there is provided an objective lens unit comprising: an actuator base; a lens holder for supporting an objective lens, the lens holder having a shaft hole penetrating therethrough, an actuator base opposing face and a cover opposing face; a shaft disposed on the actuator base and fitted to the shaft hole, the shaft having a top face; a cover attached to the actuator base so as to cover the lens holder in such a manner that the cover comes into contact with or comes close to the top face of the shaft; protrusions disposed on the actuator base and the cover in such a manner that the protrusions do not contact the shaft, the protrusions protruding toward the lens holder; an annular blade section formed on the actuator base opposing face and the cover opposing face of the lens holder in such a manner that the annular blade section surrounds the shaft hole, the annular blade section having substantially triangular section and a protruding length smaller than that of the protrusions; a focusing coil disposed on the lens holder; and a tracking coil disposed on the lens holder, wherein the lens holder is capable of sliding in a focusing direction along the shaft by an excitation of a focusing coil and also capable of oscillating around the shaft in a tracking direction by an excitation of a tracking coil, and when the protrusions contact the lens holder, a predetermined gap is formed between the lens holder and the actuator base and between the lens holder and the cover, the gap is communicated with a space in the cover through the side of the protrusions.

According to the above constitution, when the lens holder conducts a focusing motion at the maximum stroke in the initial motion test which is made in a factory before the product is shipped, the protrusions arranged on the actuator base and the cover respectively collide with the lens holder. Due to the foregoing, a predetermined gap can be formed between the lens holder and the actuator base and also between the holder and the cover. Since the shaft hole of the lens holder is separate from the actuator base and the cover, there is no possibility that dust attaching to the actuator base and the cover gets into the shaft hole. Even when a relatively large quantity of dust exists in the above gap, the dust is naturally discharged into a space in the cover through the side of the protrusions. Therefore, the lens holder can smoothly conduct a focusing motion.

According to the focusing motion of the lens holder, dust attaching to the shaft can be scraped off by the annular blade sections protruding from the actuator base opposing face and the cover opposing face of the lens holder so that the dust can not get into the shaft hole. Further, since the protruding height of the annular blade section is smaller than the height of the protrusions, even when the lens holder conducts a focusing motion at the maximum stroke, there is no possibility that dust attaching to the actuator base and the cover gets into the gap formed between the annular blade section and the shaft.

According to a third aspect of the invention, there is provided an objective lens unit comprising: an actuator base; a lens holder for supporting an objective lens, the lens holder having a shaft hole penetrating therethrough, an actuator base opposing face and a cover opposing face; a shaft disposed on the actuator base and fitted to the shaft hole, the shaft having a top face; a cover attached to the actuator base so as to cover the lens holder in such a manner that the cover comes into contact with or comes close to the top face of the shaft; protrusions disposed on the actuator base opposing face in such a manner that the protrusions do not contact the shaft; a focusing coil disposed on the lens holder; and a tracking coil disposed on the lens holder, wherein the lens holder is capable of sliding in a focusing direction along the shaft by an excitation of a focusing coil and also capable of oscillating around the shaft in a tracking direction by an excitation of a tracking coil, and when the protrusions contact the actuator base, a predetermined gap is formed between the lens holder and the actuator base, the gap is communicated with a space in the cover through the side of the protrusions.

According to the above constitution, when the lens holder conducts a focusing motion at the maximum stroke in the initial motion test which is made in a factory before the product is shipped, the protrusions arranged on the lens holder collide with the actuator base. Due to the foregoing, a predetermined gap can be formed between the lens holder and the actuator base. Since the shaft hole of the lens holder is separate from the actuator base, there is no possibility that dust attaching to the actuator base gets into the shaft hole. Even when a relatively large quantity of dust exists in the above gap, the dust is naturally discharged into a space in the cover through the side of the protrusions. Therefore, the lens holder can smoothly conduct a focusing motion.

A fourth aspect of the invention provides an objective lens unit according to the third aspect, further comprising: protrusions formed on the cover opposing face of the lens holder in such a manner that the protrusions is not contacted with the shaft, a predetermined gap is formed between the lens holder and the cover when the protrusions contact the cover, and the gap is communicated with a space in the cover through the side of the protrusions.

According to the above constitution, when the lens holder conducts a focusing motion at the maximum stroke in the initial motion test which is made in a factory before the product is shipped, the protrusions arranged on the lens holder collide with the cover. Due to the foregoing, a predetermined gap can be formed between the lens holder and the cover. Since the shaft hole of the lens holder is separate from the cover, there is no possibility that dust attaching to the cover gets into the shaft hole. Even when a relatively large quantity of dust exists in the above gap, the dust is naturally discharged into a space in the cover through the side of the protrusions. Therefore, the lens holder can smoothly conduct a focusing motion.

A fifth aspect of the invention provides an objective lens unit comprising: an actuator base; a lens holder for supporting an objective lens, the lens holder having a shaft hole penetrating therethrough, an actuator base opposing face and a cover opposing face; a shaft disposed on the actuator base and fitted to the shaft hole, the shaft having a top face; a cover attached to the actuator base so as to cover the lens holder in such a manner that the cover comes into contact with or comes close to the top face of the shaft; protrusions disposed on the actuator base in such a manner that the protrusions do not contact the shaft, the protrusions protruding toward the lens holder; a focusing coil disposed on the lens holder; and a tracking coil disposed on the lens holder, wherein the lens holder is capable of sliding in a focusing direction along the shaft by an excitation of a focusing coil and also capable of oscillating around the shaft in a tracking direction by an excitation of a tracking coil, and when the protrusions contact the lens holder, a predetermined gap is formed between the lens holder and the actuator base, the gap is communicated with a space in the cover through the side of the protrusions.

According to the above constitution, when the lens holder conducts a focusing motion at the maximum stroke in the initial motion test which is made in a factory before the product is shipped, the protrusions arranged on the actuator base collide with the lens holder. Due to the foregoing, a predetermined gap can be formed between the lens holder and the actuator base. Since the shaft hole of the lens holder is separate from the actuator base, there is no possibility that dust attaching to the cover gets into the shaft hole. Even when a relatively large quantity of dust exists in the above gap, the dust is naturally discharged into a space in the cover through the side of the protrusions. Therefore, the lens holder can smoothly conduct a focusing motion.

A sixth aspect of the invention provides an objective lens unit according to the fifth aspect, further comprising: protrusions formed on the cover and protruding toward the lens holder under in such a manner that the shaft does not contact the protrusions, a predetermined gap is formed between the lens holder and the cover when the protrusions are contacted with contact the lens holder, and the gap is communicated with a space in the cover through the side of the protrusions.

According to the above constitution, when the lens holder conducts a focusing motion at the maximum stroke in the initial motion test which is made in a factory before the product is shipped, the protrusions arranged on the cover collide with the lens holder. Due to the foregoing, a predetermined gap can be formed between the lens holder and the cover. Since the shaft hole of the lens holder is separate from the cover, there is no possibility that dust attaching to the cover gets into the shaft hole. Even when a relatively large quantity of dust exists in the above gap, the dust is naturally discharged into a space in the cover through the side of the protrusions. Therefore, the lens holder can smoothly conduct a focusing motion.

A seventh aspect of the invention provides an objective lens unit according to the third aspect, objective lens unit according to claim 3, wherein an annular blade section, the lateral section of which is substantially triangular, the protruding length of which is smaller than the protruding length of the protrusions, is formed on the actuator base opposing face and/or the cover opposing face of the lens holder in such a manner that the annular blade section surrounds the shaft hole of the lens holder.

Due to the above constitution, according to the focusing motion of the lens holder, dust attaching to the shaft can be scraped off by the annular blade section protruding from the actuator base opposing face and/or the cover opposing face of the lens holder so that the dust can not get into the shaft hole. Further, since the protruding length of the annular blade section is smaller than the length of the protrusions, even when the lens holder conducts a focusing motion at the maximum stroke, there is no possibility that the dust attaching to the actuator base or the cover gets into the gap formed between the annular blade section and the shaft.

An eighth aspect of the invention provides an objective lens unit according to the third aspect, wherein the following equation [1] is are established, $$\delta/(L1-H) = \tan\theta \quad [1]$$

A ninth aspect of the invention provides an objective lens unit according to the eighth aspect, wherein the following equations [2] and [3] are established, $$\delta max/(L1-H) = \max\tan\theta \quad [2]$$

$$\delta min/(L1-H) = \tan\theta min \quad [3]$$

where $\delta max$ represents the maximum value of an allowable gap dimension $\delta$, $\theta max$ represents the maximum value of an allowable inclination angle, $\delta min$ represents the minimum value of an allowable gap dimension $\delta$, and $\theta min$ represents the minimum inclination angle, and the following equation is established, $$H \leq Hmax$$

where Hmax is calculated based on the equations [2] and [3] represents the maximum value of the protruding length of the protrusions.

DETAILED DESCRIPTION OF THE PREFFERED EMBODIMENTS

Figure 18:
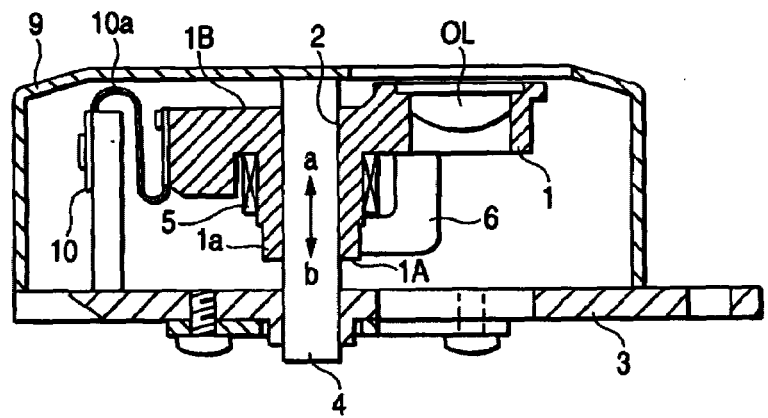
FIG. 18 is a longitudinally sectional view showing a conventional example.
Figure 19:
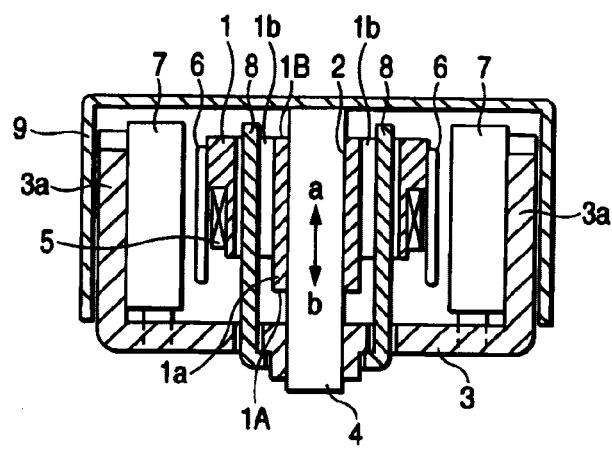
FIG. 19 is a laterally sectional view showing the conventional example.
Figure 20:
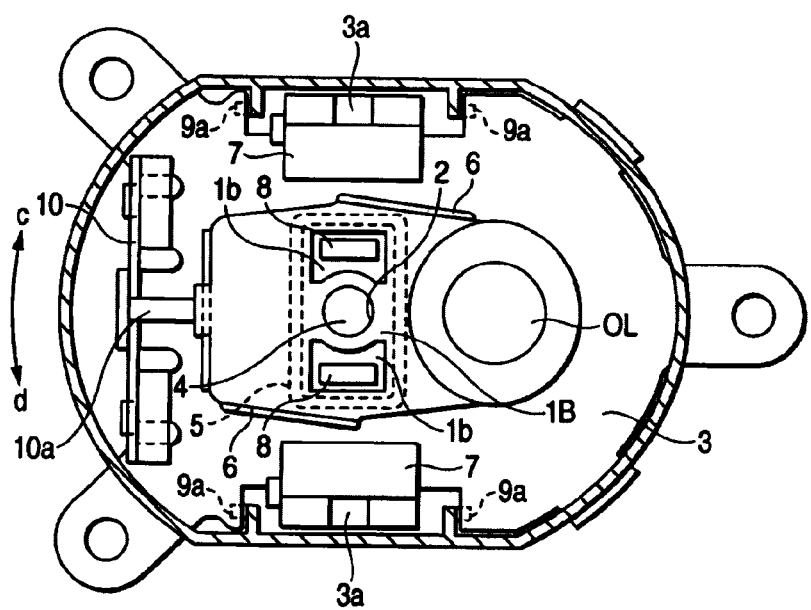
FIG. 20 is a horizontally sectional view showing the conventional example.
Figure 21:
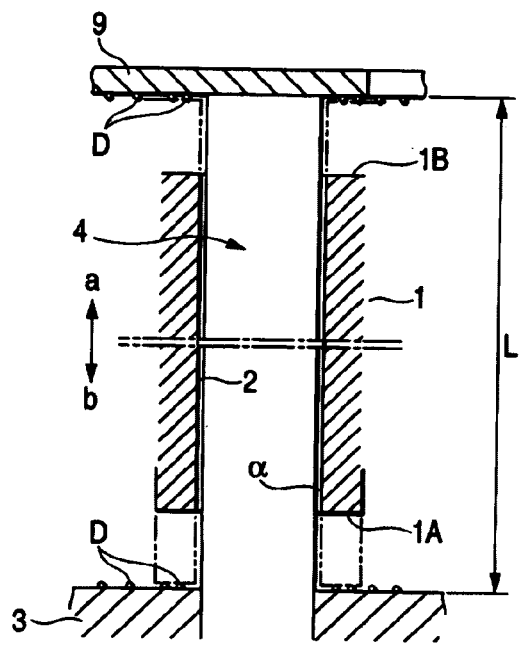
FIG. 21 is a longitudinally sectional view partially showing a focusing motion of a lens holder composing the objective lens unit of the conventional example.
Figure 22:
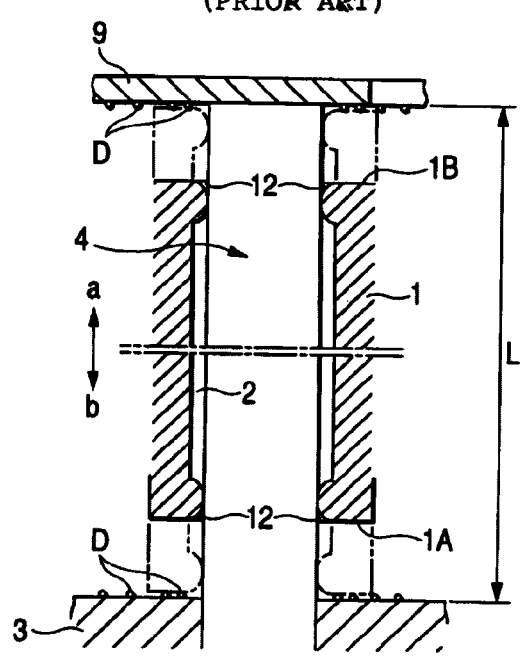
FIG. 22 is a longitudinally sectional view partially showing a focusing motion of a lens holder composing an objective lens unit of another conventional example.

FIGS. 1 to 5 are views showing an objective lens unit according to a first embodiment of the present invention. A plurality of protrusions 14 (two protrusions 14 in this embodiment), the protruding length H and the width D of which are 0.5 to 2 mm, are arranged at predetermined intervals in the circumferential direction on an actuator base opposing face 1A and a cover opposing face 1B of a lens holder 1. In this structure, interval t of 0.5 to 1 mm is formed between the protrusions 14 and the shaft hole 2. As shown by the virtual line in FIG. 6, when each protrusion 14 is contacted with the actuator base 3 and the cover 9, a predetermined gap 15 is formed between the lens holder 1 and the actuator base 3 and between the lens holder 1 and the cover 9, and the gap 15 is communicated with the space 16 in the cover through the side of the protrusions 14. Except for the above points, the constitution of this embodiment is substantially the same as the constitution shown in FIGS. 18 to 20. Therefore, like reference characters are used to indicate like parts in various views of FIGS. 1 to 5 and FIGS. 16 to 18, and explanations are omitted here.

Figure 1:
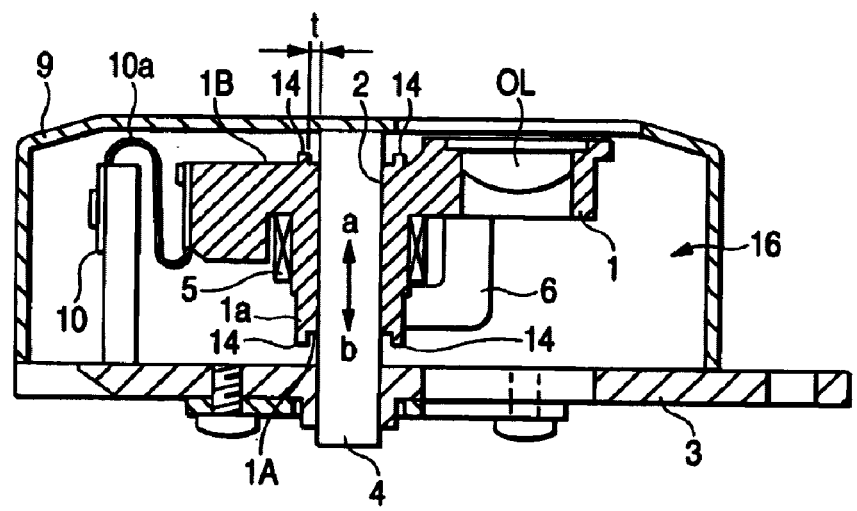
FIG. 1 is a longitudinally sectional view showing an objective lens unit of a first embodiment of the invention.
Figure 2:
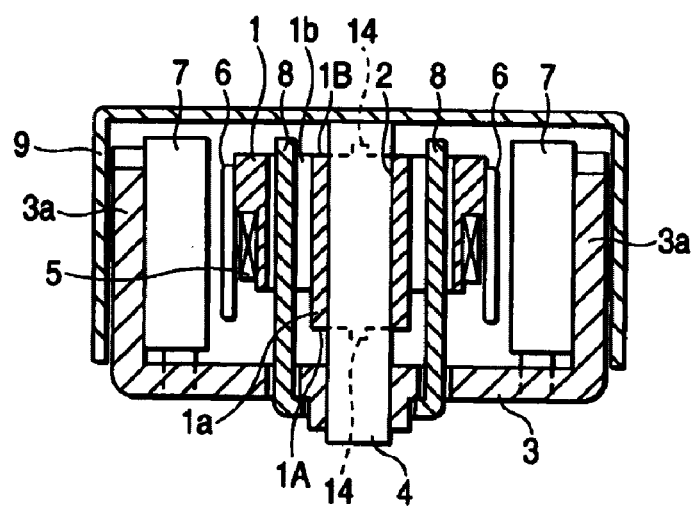
FIG. 2 is a laterally sectional view showing the objective lens unit.
Figure 3:
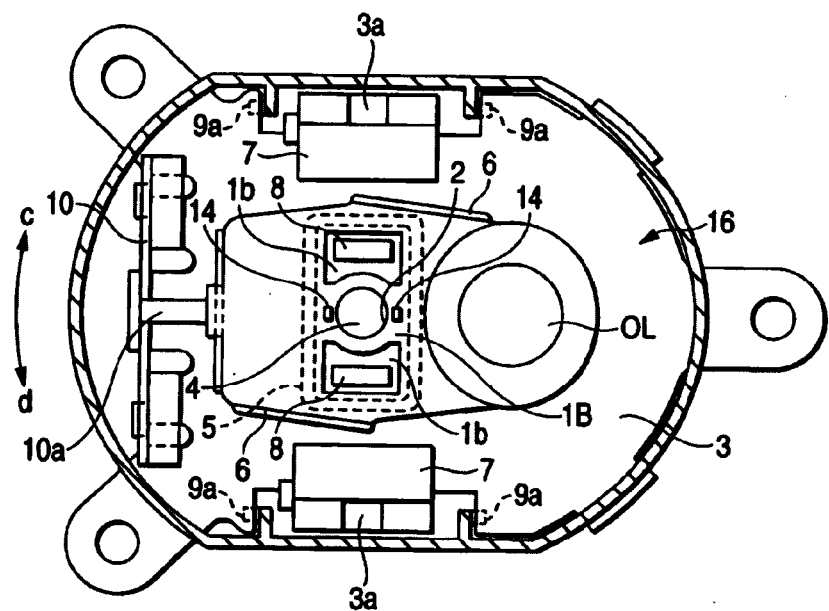
FIG. 3 is a horizontally sectional view showing the objective lens unit.
Figure 4:
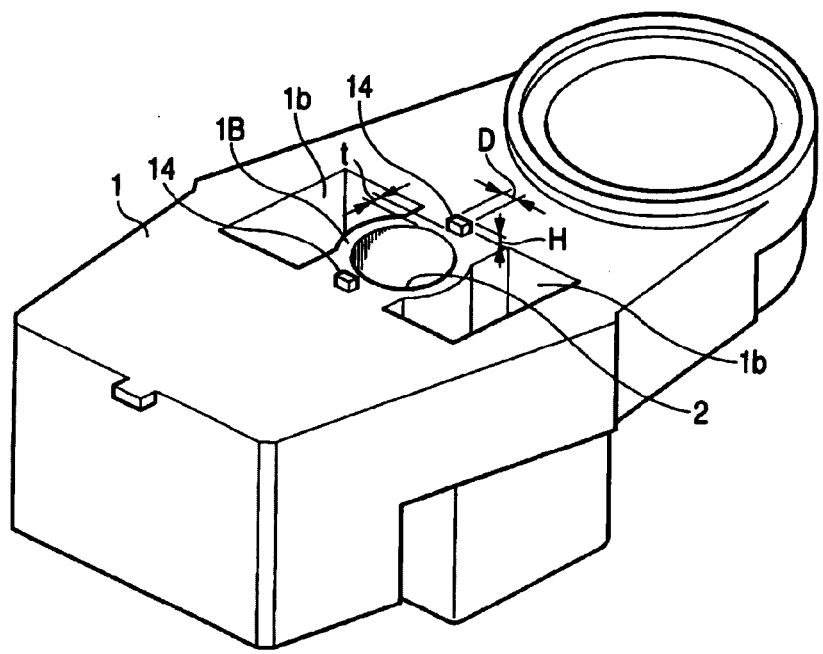
FIG. 4 is a perspective view of a lens holder of the objective lens unit, wherein the view is taken from an upper side.
Figure 5:
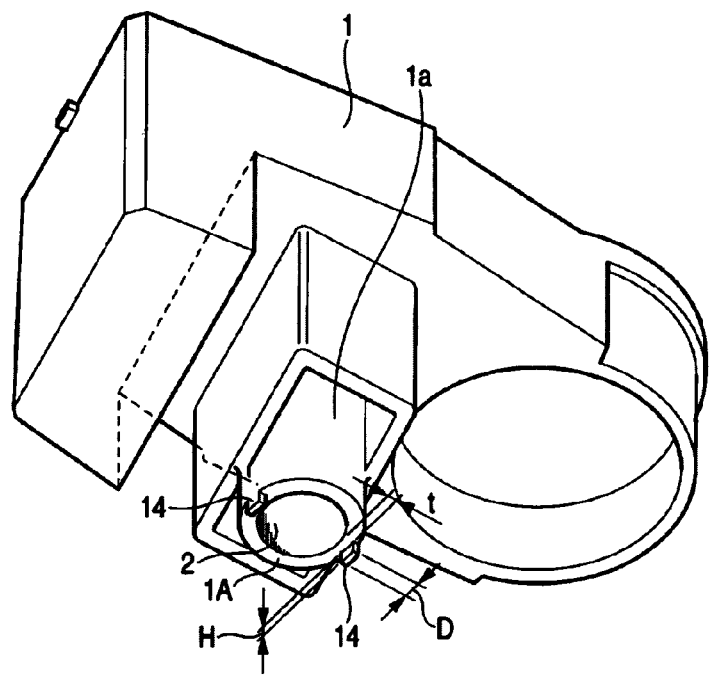
FIG. 5 is a perspective view of the lens holder, wherein the view is taken from an lower side.
Figure 6:
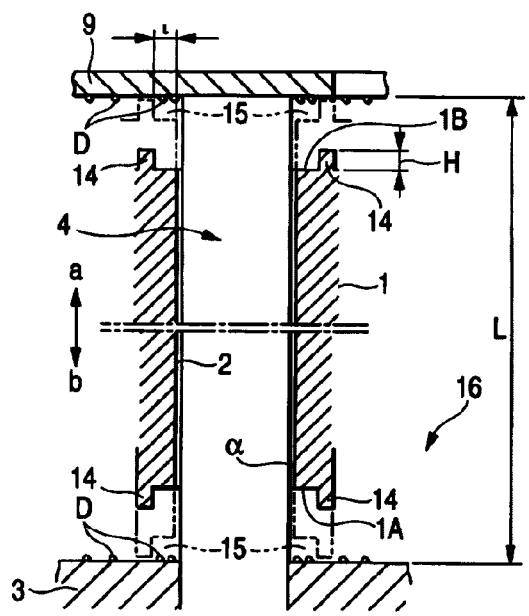
FIG. 6 is a longitudinally perspective view partially showing a focusing motion of the objective lens unit.

According to the above constitution, when the lens holder 1 conducts a focusing motion at the maximum stroke as shown by the virtual line in FIG. 6 in the initial motion test made in a factory before the product is shipped, the protrusions 14 arranged on the actuator base opposing face 1A and the cover opposing face 1B of the lens holder collide with the actuator base 3 and the cover 9. Due to the foregoing, a predetermined gap 9 can be ensured between the lens holder 1 and the actuator base 3 and between the lens holder 1 and the cover 9. Since the shaft hole 2 of lens holder 1 is separate from the actuator base 3 and the cover 9, there is no possibility that dust D attaching to the actuator base 3 and the cover 9 gets into the shaft hole 2. Even when a relatively large quantity of dust D exists in the above gap 15, dust D is naturally discharged into a space 16 in the cover through the side of the protrusions 14. Therefore, the lens holder 1 can smoothly conduct a focusing motion.

Figure 7:
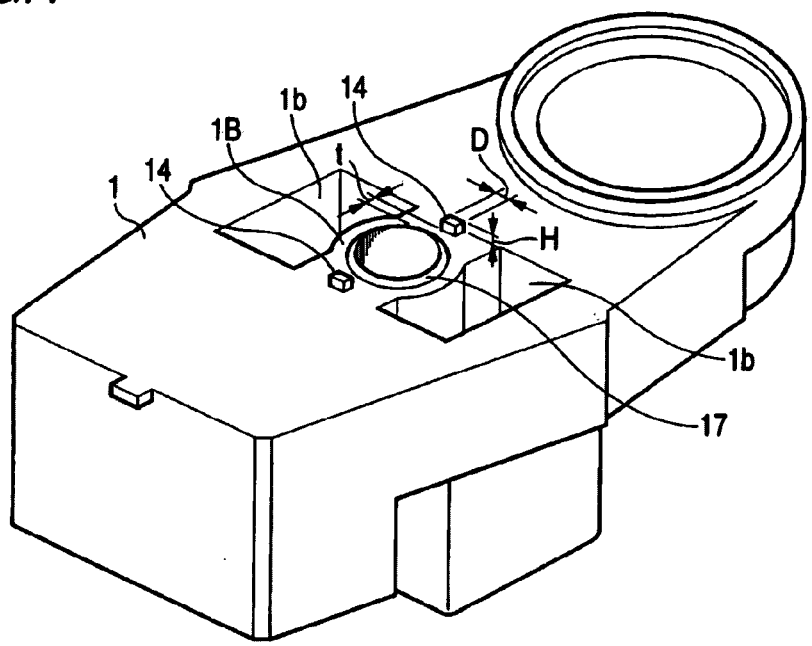
FIG. 7 is a perspective view of a lens holder composing an objective lens unit of a second embodiment of the invention, wherein the view is taken from an upper side.
Figure 8:
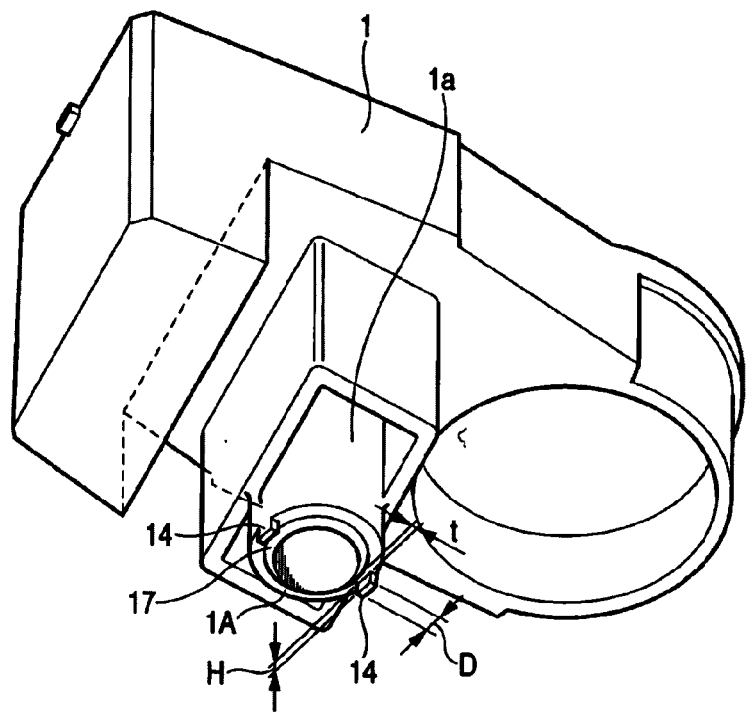
FIG. 8 is a perspective view of the lens holder of the second embodiment, wherein the view is taken from a lower side.
Figure 9:
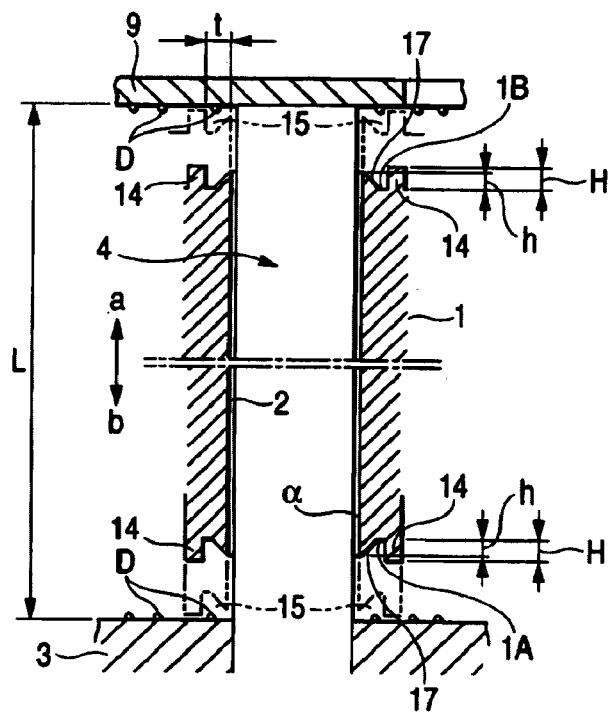
FIG. 9 is a longitudinally sectional view partially showing a focusing motion of the lens holder of the second embodiment.

FIGS. 7 to 9 are views partially showing an objective lens unit of a second embodiment of the present invention. In addition to the constitution shown in the first embodiment, in this embodiment, an annular blade section 17, the lateral section of which is substantially triangular, the protruding length h of which is smaller than the protruding length of the protrusions 14, is arranged on the actuator base opposing face 1A and the cover opposing face 1B of the lens holder 1 in such a manner that the annular blade section 17 surrounds the shaft hole 2.

According to the above constitution, of course, the same effect as that of the first embodiment can be provided. According to the focusing motion conducted by the lens holder 1, dust D attaching to the shaft 4 can be scraped off by the annular blade section 17 so that dust D can not get into the shaft hole 2. Since protruding length h of the annular blade section 17 is set at a value lower than protruding length H of the protrusions 14, even when the lens holder 1 conducts a focusing motion at the maximum stroke as shown by the virtual line in FIG. 9, there is no possibility that dust D attaching to the actuator base 3 and the cover 9 gets into gap α formed between the annular blade section 17 and the shaft 4.

In the first and the second embodiments, the protrusions 14 and the annular blade section 17 are arranged on both the actuator base opposing face 1A and the cover opposing face 1B of the lens holder 1. However, the present invention is not limited to the above specific embodiment. It is possible to apply the invention to a case in which the protrusions 14 and/or the annular blade section 17 are arranged on one of the actuator base opposing face 1A and the cover opposing face 1B of the lens holder 1.

Figure 10:
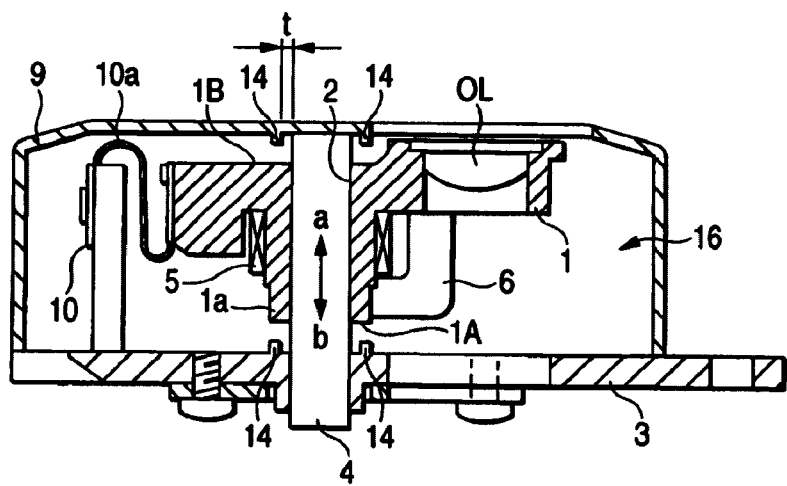
FIG. 10 is a longitudinally sectional view showing an objective lens unit of a third embodiment of the invention.
Figure 11:
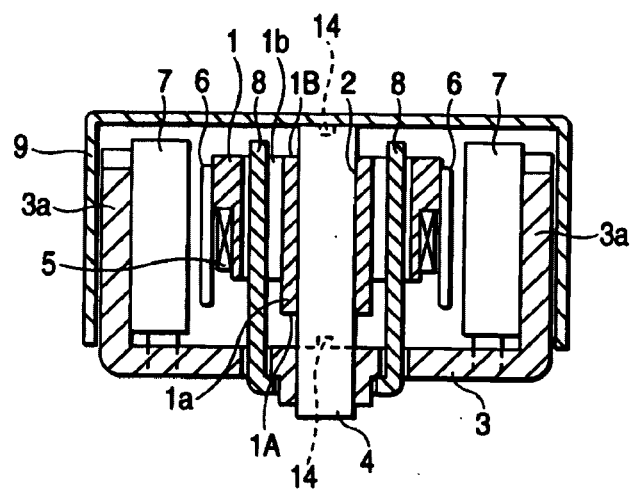
FIG. 11 is a laterally sectional view showing the objective lens unit of the third embodiment.
Figure 12:
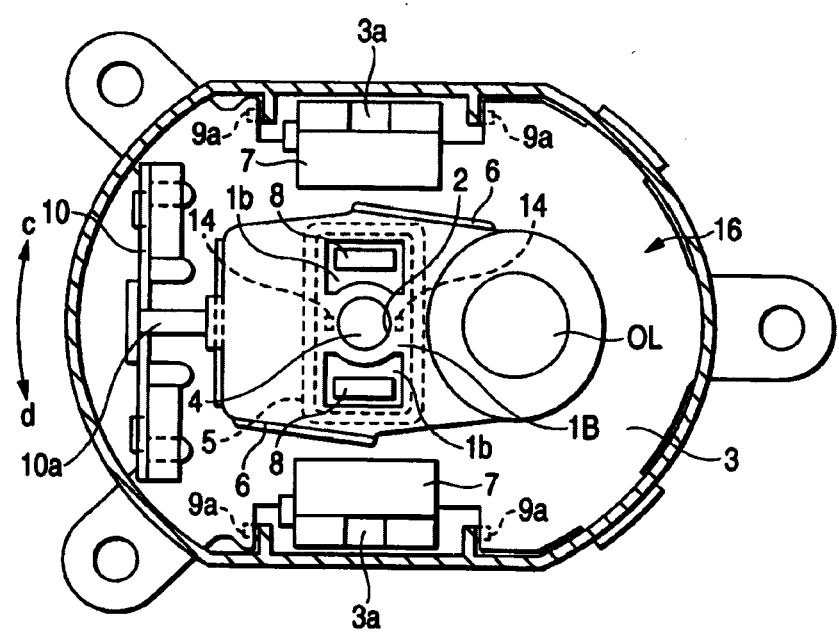
FIG. 12 is a horizontally sectional view showing the objective lens unit of the third embodiment.

FIGS. 10 to 12 are views showing an objective lens unit of a third embodiment of the present invention. A plurality of protrusions 14 (two protrusions 14 in this embodiment), the protruding length H and the width D of which are 0.5 to 2 mm, are arranged at predetermined intervals in the circumferential direction on the actuator base 3 and the cover 9. In this structure, interval t of 0.5 to 1 mm is formed between the protrusions 14 and the shaft 4. Except for the above points, the constitution and the action effect of this embodiment are substantially the same as those of the first embodiment shown in FIGS. 1 to 6. Therefore, like reference characters are used to indicate like parts in FIGS. 1 to 6 and FIGS. 10 to 12, and explanations are omitted here.

Figure 13:
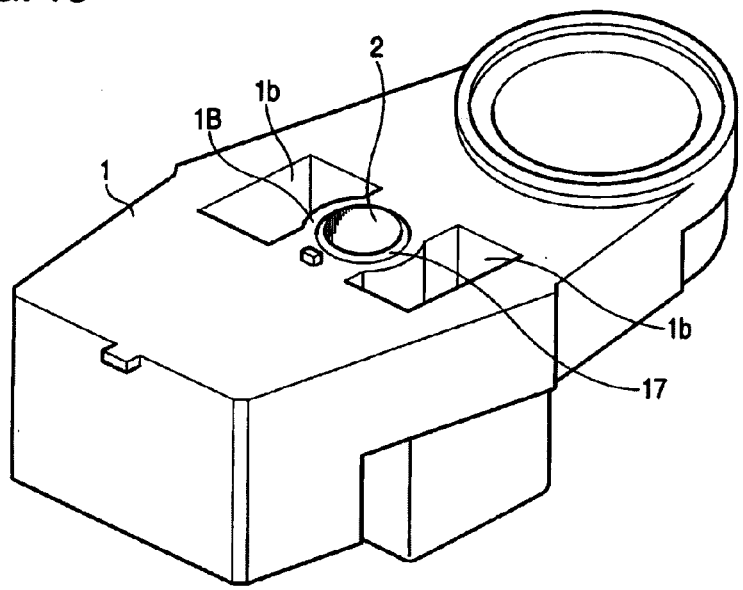
FIG. 13 is a perspective view of a lens holder composing an objective lens unit of a fourth embodiment of the invention, wherein the view is taken from an upper side.
Figure 14:
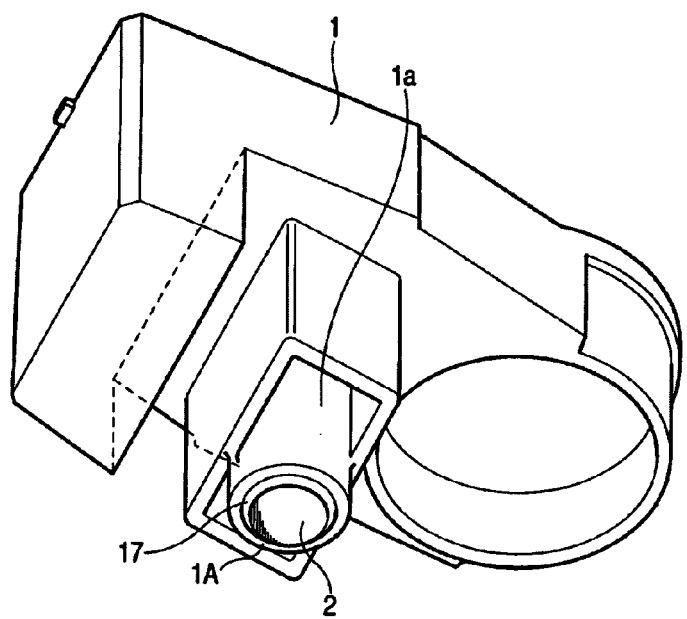
FIG. 14 is a perspective view of the lens holder of the fourth embodiment, wherein the view is taken from a lower side.
Figure 15:
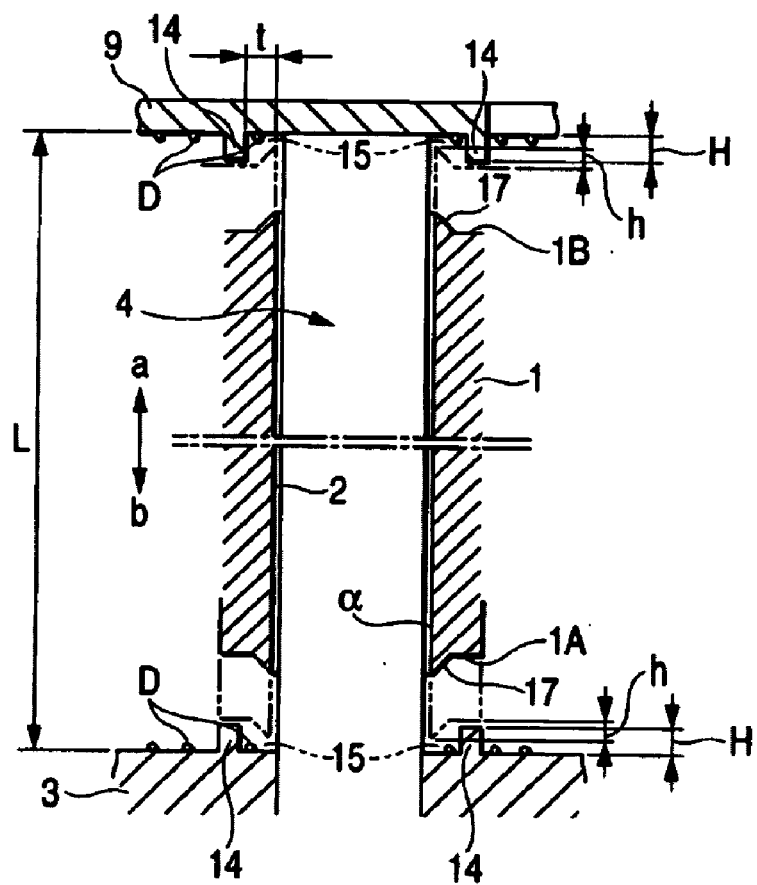
FIG. 15 is a longitudinally sectional view partially showing a focusing motion of the lens holder of the fourth embodiment.

FIGS. 13 to 15 are views showing an objective lens unit of a fourth embodiment of the present invention. In addition to the constitution of the third embodiment shown in FIGS. 10 to 12, in this embodiment, an annular blade section 17, the lateral section of which is substantially triangular, the protruding length h of which is smaller than the protruding length of the protrusions 14, is arranged on the actuator base opposing face 1A and the cover opposing face 1B of the lens holder 1 in such a manner that the annular blade section 17 surrounds the shaft hole 2. In this embodiment, it is possible to provide the same action effect as that of the second embodiment. Therefore, the explanations are omitted here.

In the third and the fourth embodiment, the protrusions 14 are arranged on both the actuator base 3 and the cover 9. However, the present invention is not limited to the above specific embodiment. It is possible to apply the invention to a case in which the protrusions 14 are arranged in one of the actuator base 3 and the cover 9. In the third and the fourth embodiment, the annular blade section 17 is arranged on both the actuator base opposing face 1A and the cover opposing face 1B of the lens holder 1. However, the present invention is not limited to the above specific embodiment. It is possible to apply the invention to a case in which the annular blade section 17 is arranged on one of the actuator base opposing face 1A and the cover opposing face 1B of the lens holder 1.

In the above-described embodiments, the height of the lens holder excluding the protrusions and the size of the gap defined between the shaft 4 and the shaft hole 2 of the lens holder 1 affect the focusing motion (slidability of the lens holder along a shaft axial direction). Since limiting the size of the lens holder to downsize the objective lens unit is necessary, it is required to determine the length of the shaft hole and the height of the whole lens holder to be within predetermined ranges.

Figure 16A:
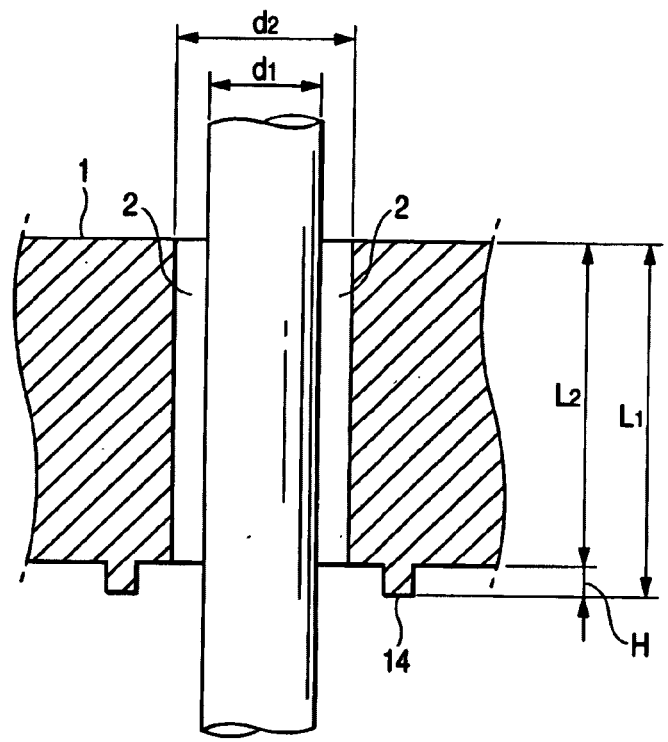
FIGS. 16A and 16B are diagrams for explaining equations [1], [2] and [3]
Figure 16B:
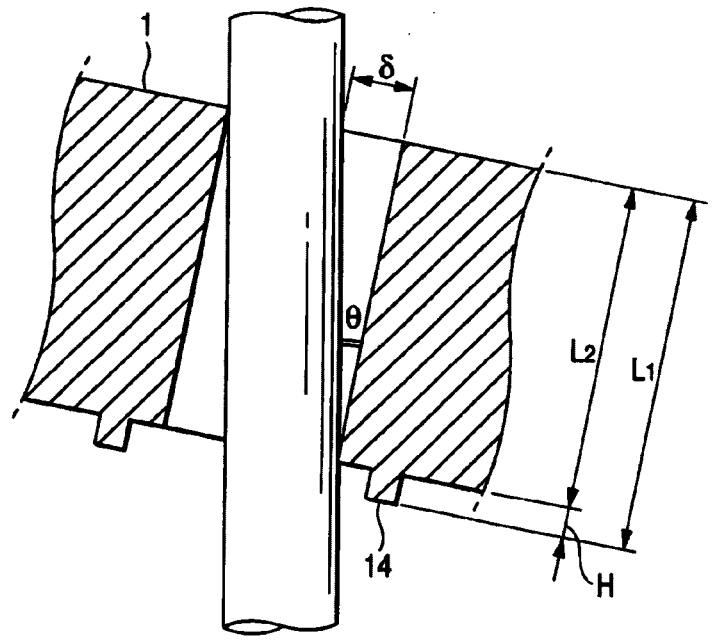

In FIG. 16A, when the length L2 of the shaft hole is short, the slidability is enhanced, but on the other hand, rattles might occur and the focusing motion stability is degraded. When the length L2 is long, rattles hardly occur and the focusing motion stability is enhanced, but the slidability is degraded. A reference character d1 denotes an outer diameter of the sharft 1, and a reference d2 denotes a diameter of the shaft hole 2. A gap dimension δ is calculated by an equation, δ=d2 −d1. When the value of is large, the slidability is enhanced, but the focusing motion stability is degraded by rattles. When the value of δ is small, rattles hardly occur and the focusing stability is enhanced, but the slidability is degraded.

Inventors of the present invention found out that the appearance of defective product (defective fraction) can be suppressed by determining the protruding length H of the protrusions within a predetermined range (H≦Hmax). The predetermined range can be calculated based on the following equation [1] and also using the equations [2] and [3]:

$$\delta/(L1-H)=\tan\theta \quad [1]$$

$$\delta\max/(L1-H)=\tan\theta\max \quad [2]$$

$$\delta\min/(L1-H)=\tan\theta\min \quad [3]$$

where H represents the protruding length of the protrusions;

Hmax represents the maximum value of the protruding length H of the protrusions calculated by equations [1] and [2];

L1 represents the height of the whole lens holder including the protrusions;

L1−H represents the length of the shaft hole;

d1 represents the outer diameter of the shaft;

d2 represents the diameter of the shaft hole of the lens holder;

δ represents the difference between the diameter of the shaft hole and the outer diameter of the shaft (δ=d2−21);

θ represents an inclination angle of the shaft hole with respect to the shaft in a state where the shaft is fitted into the shaft hole;

θmax represents the maximum value of an allowable inclination angle;

θmin represents the minimum value of an allowable inclination angle;

δmax represents the maximum value of an allowable gap dimension δ; and

δmin represents the minimum value of an allowable gap dimension δ.

Examples are described below.

The first example shows a calculation for appropriately determining the protruding length H of the protrusions in a case where the allowable range of the inclination angle θ when conducting the smooth focusing motion; the outer diameter d1 of the shaft; the diameter d2 of the shaft hole; and the height dimension L1 of the whole lens holder including the protrusions are given.

The maximum and minimum values of the allowable inclination angle θmax and θmin can be assumed as 15 arc-minute and 0 degree. Thus θ is represented as follows.

$$0°\leq\theta\leq15'$$

Here, degree is represented as °, arc-minute is represented as ' and arcsecond is represented as ".

When d1 is 2.015±0.003 mm, L1 is 5.9 mm, and d2 is 2.025±0.003 mm, δmin and δmax can be calculated as 0.004 mm and 0.016 mm. Thus δ is represented as follows.

$$0.004\text{ mm}\leq\delta\leq0.016\text{ mm}$$

When 0.016 mm, 5.9 mm and 15 arc-minute are substituted to θmax, L1 and θmax, equation [2] becomes as follows.

$$0.016/(5.9-H\max)=\tan 15'$$

Thus, the following is obtained.

$$H\max=2.233\text{ (mm)}$$

Due to the foregoing, the allowable range of the protruding length H of the protrusions is represented as, H≦0.233 mm. When H exceeds this range, the length of the shaft hole is too short and rattles occur so that the smooth focusing motion is degraded. When H≦0.233 mm, the smooth focusing motion can be conducted and the height of the whole lens holder is enough (L1=5.9 mm).

The second example show a calculation for judging whether or not the inclination angle θ is within the predetermined range (0°≦θ≦15'), in a case where the shaft and the lens holder have the same dimension with the first example (d1=2.015±0.003 mm, L1=5.9 mm and d2=2.025±0.003 mm).

When 0.016 mm, 5.9 mm, 2 mm and 0.004 mm are substituted to δmax, L1, H and δmin, equations [2] and [3] become as follows.

$$0.016/(5.9-2)=\tan\theta\max \quad [2]'$$

$$0.004/(5.9-2)=\tan\theta\min \quad [3]'$$

By calculating inverse functions of [2]' and [3]', θmax and θmin are obtained as follows.

$$\theta\max=14'6''$$

$$\theta\min=3'32''$$

Since both of θmax and θmin are not more than 15', this objective lens unit can be judged as one capable of conducting the smooth focusing motion.

Figure 17:
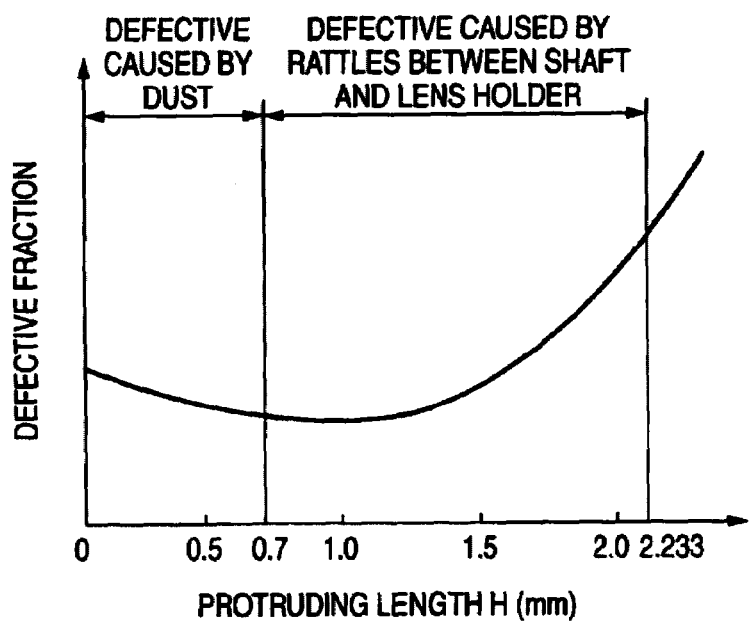
FIG. 17 is a graph showing the relationship between protruding length of protrusions and defective fraction.

FIG. 17 is a graph showing a relationship between protruding length H of the protrusions and defective fraction. It is conceivable that defective products are manufactured due to dust getting into the shaft hole of the lens holder. The protruding length H, at which dust hardly get into the shaft hole, is set as 0.7 mm. Thus, it is conceivable that occurrence of defective products in the range, H>0.7 mm, is mainly due to rattles during the focusing motion of the lens holder. As can be seen from FIG. 17, defective fraction increases to unacceptable level when the protruding length H is in the range, H>2.233 mm.

According to the first aspect of the invention, when the lens holder conducts a focusing motion at the maximum stroke in the initial motion test which is made in a factory before the product is shipped, the protrusions arranged on the actuator base opposing face and the cover opposing face of the lens holder respectively collide with the actuator base and the cover. Due to the foregoing, a predetermined gap can be formed between the lens holder and the actuator base and also between the lens holder and the cover. Since the shaft hole of the lens holder is separate from the actuator base and the cover, there is no possibility that dust attaching to the actuator base and the cover gets into the shaft hole. Even when a relatively large quantity of dust exists in the above gap, the dust is naturally discharged into a space in the cover through the side of the protrusions. Therefore, the lens holder can smoothly conduct a focusing motion.

According to the focusing motion of the lens holder, dust attaching to the shaft can be scraped off by the annular blade sections protruding from the actuator base opposing face and the cover opposing face of the lens holder so that the dust can not get into the shaft hole. Further, since the protruding height of the annular blade section is smaller than the height of the protrusions, even when the lens holder conducts a focusing motion at the maximum stroke, there is no possibility that the dust attaching to the actuator base and the cover gets into the gap formed between the annular blade section and the shaft.

According to the second aspect of the invention, when the lens holder conducts a focusing motion at the maximum stroke in the initial motion test which is made in a factory before the product is shipped, the protrusions arranged on the actuator base and the cover respectively collide with the lens holder. Due to the foregoing, a predetermined gap can be formed between the lens holder and the actuator base and also between the holder and the cover. Since the shaft hole of the lens holder is separate from the actuator base and the cover, there is no possibility that dust attaching to the actuator base and the cover gets into the shaft hole. Even when a relatively large quantity of dust exists in the above gap, the dust is naturally discharged into a space in the cover through the side of the protrusions. Therefore, the lens holder can smoothly conduct a focusing motion.

According to the focusing motion of the lens holder, dust attaching to the shaft can be scraped off by the annular blade sections protruding from the actuator base opposing face and the cover opposing face of the lens holder so that the dust can not get into the shaft hole. Further, since the protruding height of the annular blade section is smaller than the height of the protrusions, even when the lens holder conducts a focusing motion at the maximum stroke, there is no possibility that dust attaching to the actuator base and the cover gets into the gap formed between the annular blade section and the shaft.

According to the third aspect of the invention, when the lens holder conducts a focusing motion at the maximum stroke in the initial motion test which is made in a factory before the product is shipped, the protrusions arranged on the lens holder collide with the actuator base. Due to the foregoing, a predetermined gap can be formed between the lens holder and the actuator base. Since the shaft hole of the lens holder is separate from the actuator base, there is no possibility that dust attaching to the actuator base gets into the shaft hole. Even when a relatively large quantity of dust exists in the above gap, the dust is naturally discharged into a space in the cover through the side of the protrusions. Therefore, the lens holder can smoothly conduct a focusing motion.

According to the fourth aspect of the invention, when the lens holder conducts a focusing motion at the maximum stroke in the initial motion test which is made in a factory before the product is shipped, the protrusions arranged on the lens holder collide with the cover. Due to the foregoing, a predetermined gap can be formed between the lens holder and the cover. Since the shaft hole of the lens holder is separate from the cover, there is no possibility that dust attaching to the cover gets into the shaft hole. Even when a relatively large quantity of dust exists in the above gap, the dust is naturally discharged into a space in the cover through the side of the protrusions. Therefore, the lens holder can smoothly conduct a focusing motion.

According to the fifth aspect of the invention, when the lens holder conducts a focusing motion at the maximum stroke in the initial motion test which is made in a factory before the product is shipped, the protrusions arranged on the actuator base collide with the lens holder. Due to the foregoing, a predetermined gap can be formed between the lens holder and the actuator base. Since the shaft hole of the lens holder is separate from the actuator base, there is no possibility that dust attaching to the actuator base gets into the shaft hole. Even when a relatively large quantity of dust exists in the above gap, the dust is naturally discharged into a space in the cover through the side of the protrusions. Therefore, the lens holder can smoothly conduct a focusing motion.

According to the sixth aspect of the invention, when the lens holder conducts a focusing motion at the maximum stroke in the initial motion test which is made in a factory before the product is shipped, the protrusions arranged on the cover collide with the lens holder. Due to the foregoing, a predetermined gap can be formed between the lens holder and the cover. Since the shaft hole of the lens holder is separate from the cover, there is no possibility that dust attaching to the cover gets into the shaft hole. Even when a relatively large quantity of dust exists in the above gap, the dust is naturally discharged into a space in the cover through the side of the protrusions. Therefore, the lens holder can smoothly conduct a focusing motion.

According to the seventh aspect of the invention, dust attaching to the shaft can be scraped off by the annular blade section protruding from the actuator base opposing face and/or the cover opposing face of the lens holder in accordance with the focusing motion of the lens holder, so that dust cannot get into the shaft hole. Further, since the protruding length of the annular blade section is smaller than the length of the protrusions, even when the lens holder conducts a focusing motion at the maximum stroke, there is no possibility that dust attaching to the actuator base or the cover gets into the gap formed between the annular blade section and the shaft.

According to the eighth or ninth aspect of the invention, appropriate length of the shaft hole and protruding length of the protrusions can be determined so as to maintain the stability of the focusing motion even in a case where limiting the height of the whole lens holder including the protrusions to a predetermined value is required. Also, it becomes possible to easily judge whether or not designed values such as the height of the whole lens holder including the protrusions, the length of the shaft hole, the protruding length of the protrusions, and the inclination angle are within a range in which the stability of the focusing motion is maintained.

What is claimed is:

1. An objective lens unit comprising:
   an actuator base;
   a lens holder for supporting an objective lens, the lens holder having a shaft hole penetrating therethrough, an actuator base opposing face and a cover opposing face;
   a shaft disposed on the actuator base and fitted to the shaft hole, the shaft having a top face; a cover attached to the actuator base so as to cover the lens holder in such a manner that the cover comes into contact with or comes close to the top face of the shaft;
   protrusions disposed on the actuator base opposing face and the cover opposing face of the lens holder in such a manner that the protrusions do not contact the shaft;
   an annular blade section formed on the actuator base opposing face and the cover opposing face of the lens holder in such a manner that the annular blade section surrounds the shaft hole, the annular blade section having substantially triangular section and a protruding length smaller than that of the protrusions;
a focusing coil disposed on the lens holder; and
a tracking coil disposed on the lens holder, wherein the lens holder is capable of sliding in a focusing direction along the shaft by an excitation of the focusing coil and also capable of oscillating around the shaft in a tracking direction by an excitation of the tracking coil, and
when the protrusions contact the actuator base and the cover, a predetermined gap is formed between the lens holder and the actuator base and between the lens holder and the cover, the gap is communicated with a space in the cover through the side of the protrusions.

2. An objective lens unit comprising:
an actuator base;
a lens holder for supporting an objective lens, the lens holder having a shaft hole penetrating therethrough, an actuator base opposing face and a cover opposing face;
a shaft disposed on the actuator base and fitted to the shaft hole, the shaft having a top face;
a cover attached to the actuator base so as to cover the lens holder in such a manner that the cover comes into contact with or comes close to the top face of the shaft;
protrusions disposed on the actuator base and the cover in such a manner that the protrusions do not contact the shaft, the protrusions protruding toward the lens holder;
an annular blade section formed on the actuator base opposing face and the cover opposing face of the lens holder in such a manner that the annular blade section surrounds the shaft hole, the annular blade section having substantially triangular section and a protruding length smaller than that of the protrusions;
a focusing coil disposed on the lens holder; and
a tracking coil disposed on the lens holder, wherein the lens holder is capable of sliding in a focusing direction along the shaft by an excitation of the focusing coil and also capable of oscillating around the shaft in a tracking direction by an excitation of the tracking coil, and
when the protrusions contact the lens holder, a predetermined gap is formed between the lens holder and the actuator base and between the lens holder and the cover, the gap is communicated with a space in the cover through the side of the protrusions.

3. An objective lens unit comprising:
an actuator base;
a lens holder for supporting an objective lens, the lens holder having a shaft hole penetrating therethrough, an actuator base opposing face and a cover opposing face;
a shaft disposed on the actuator base and fitted to the shaft hole, the shaft having a top face;
a cover attached to the actuator base so as to cover the lens holder in such a manner that the cover comes into contact with or comes close to the top face of the shaft;
protrusions disposed on the actuator base opposing face in such a manner that the protrusions do not contact the shaft;
an annular blade section formed on the actuator base opposing face and the cover opposing face of the lens holder in such a manner that the annular blade section surrounds the shaft hole, the annular blade section having substantially triangular section and a protruding length smaller than that of the protrusions:
a focusing coil disposed on the lens holder; and
a tracking coil disposed on the lens holder,
wherein the lens holder is capable of sliding in a focusing direction along the shaft by an excitation of the focusing coil and also capable of oscillating around the shaft in a tracking direction by an excitation of the tracking coil, and
when the protrusions contact the actuator base, a predetermined gap is formed between the lens holder and the actuator base, the gap is communicated with a space in the cover through the side of the protrusions.

4. An objective lens unit according to claim 3, further comprising: protrusions formed on the cover opposing face of the lens holder in such a manner
that the protrusions do not contact the shaft, a predetermined gap is formed between the lens holder and the cover when the protrusions contact the cover, and the gap is communicated with a space in the cover through the side of the protrusions.

5. An objective lens unit according to claim 3, wherein an annular blade section, the lateral section of which is substantially triangular, the protruding length of which is smaller than the protruding length of the protrusions, is formed on at least one of the actuator base opposing face and the cover opposing face of the lens holder in such a manner that the annular blade section surrounds the shaft hole of the lens holder.

6. An objective lens unit according to claim 3, wherein the following equation [1] is established, $$\delta/(L1-H) = \tan \theta \quad [1]$$

where $\delta$ represents the difference between the diameter of the shaft hole and the outer diameter of the shaft, $\theta$ represents an inclination angle of the shaft hole with respect to the shaft in a state where the shaft is fitted into the shaft hole, H represents the protruding length of the protrusions, and L1 represents the height of the whole lens holder including the protrusions, and
at least one of dimensions is calculated based on the equation [1].

7. An objective lens unit according to claim 6, wherein the following equations [2] and [3] are established, $$\delta max/(L1-H) = \tan \theta max \quad [2]$$

$$\delta min/(L1-H) = \tan \theta min \quad [3]$$

where $\delta max$ represents the maximum value of an allowable gap dimensions $\delta$, $\theta max$ represents the maximum value of an allowable inclination angle, $\delta min$ represents the minimum value of an allowable gap dimension $\delta$, and $\theta min$ represents the minimum value of an allowable inclination angle, and
the following equation is established, $$H \leq Hmax$$

where Hmax is calculated based on the equations [2] and [3] represents the maximum value of the protruding length of the protrusions.

8. An objective lens unit according to claim 3, wherein the lens holder comprises a base section, and
the protrusions are formed on an end face of the base section.

9. An objective lens unit comprising:
an actuator base;
a lens holder for supporting an objective lens, the lens holder having a shaft hole penetrating therethrough, an actuator base opposing face and a cover opposing face;
a shaft disposed on the actuator base and fitted to the shaft hole, the shaft having a top face;

a cover attached to the actuator base so as to cover the lens holder in such a manner that the cover comes into contact with or comes close to the top face of the shaft;

protrusions disposed on the actuator base in such a manner that the protrusions do not contact the shaft, the protrusions protruding toward the lens holder;

an annular blade section formed on the actuator base opposing face and the cover opposing face of the lens holder in such a manner that the annular blade section surrounds the shaft hole, the annular blade section having substantially triangular section and a protruding length smaller than that of the protrusions;

a focusing coil disposed on the lens holder; and a tracking coil disposed on the lens holder, wherein the lens holder is capable of sliding in a focusing direction along the shaft by an excitation of the focusing coil and also capable of oscillating around the shaft in a tracking direction by an excitation of the tracking coil, and when the protrusions contact the lens holder, a predetermined gap is formed between the lens holder and the actuator base, the gap is communicated with a space in the cover through the side of the protrusions.

10. An objective lens unit according to claim 9, further comprising: protrusions formed on the cover and protruding toward the lens holder in such a manner that the shaft does not contact the protrusions, a predetermined gap is formed between the lens holder and the cover when the protrusions contact the lens holder, and the gap is communicated with a space in the cover through the side of the protrusions.

* * * * *